United States Patent
Song et al.

(10) Patent No.: US 11,287,887 B2
(45) Date of Patent: Mar. 29, 2022

(54) FLEXIBLE FINGER-WEARABLE HAPTIC FEEDBACK DEVICE

(71) Applicant: SOUTHEAST UNIVERSITY, Jiangsu (CN)

(72) Inventors: Aiguo Song, Jiangsu (CN); Yiting Mo, Jiangsu (CN); Huanhuan Qin, Jiangsu (CN); Huijun Li, Jiangsu (CN); Hong Zeng, Jiangsu (CN); Baoguo Xu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/271,207

(22) PCT Filed: Mar. 21, 2019

(86) PCT No.: PCT/CN2019/079094
§ 371 (c)(1),
(2) Date: Feb. 25, 2021

(87) PCT Pub. No.: WO2020/087844
PCT Pub. Date: May 7, 2020

(65) Prior Publication Data
US 2021/0333877 A1    Oct. 28, 2021

(30) Foreign Application Priority Data
Nov. 2, 2018   (CN) .......................... 201811301176.5

(51) Int. Cl.
*G06F 3/01*      (2006.01)
(52) U.S. Cl.
CPC .............. *G06F 3/014* (2013.01); *G06F 3/016* (2013.01)

(58) Field of Classification Search
CPC .................................. G06F 3/014; G06F 3/016
See application file for complete search history.

(56) References Cited

U.S. PATENT DOCUMENTS

2010/0234182 A1* 9/2010 Hoffman ................ G06F 3/014
482/8

FOREIGN PATENT DOCUMENTS

| CN | 107229344 | 10/2017 | |
| CN | 108614639 | * 10/2018 | ............. G06F 3/014 |
| EP | 2653954 | 10/2013 | |

OTHER PUBLICATIONS

"International Search Report (Form PCT/ISA/210)" of PCT/CN2019/079094, dated Aug. 1, 2019, with English translation thereof, pp. 1-4.

(Continued)

*Primary Examiner* — Towfiq Elahi
(74) *Attorney, Agent, or Firm* — JCIPRNET

(57) ABSTRACT

A flexible finger-wearable haptic feedback device includes a fingertip sleeve sheathing a distal phalanx of a finger, a middle sleeve sheathing a middle phalanx of the finger, a proximal sleeve sheathing a proximal phalanx of the finger, outer and inner transmission rods having bending elasticity. The outer transmission rod is fixed on the fingertip sleeve at one end, positioned at a back of a hand at the other end and connected with an outer driver. The inner transmission rod is fixed on the fingertip sleeve at one end, positioned at a palm at the other end and connected with an inner driver. The fingertip sleeve is provided with first and second contact pressure sensors respectively connected with the ends of the outer and inner transmission rods, and an inner wall of the fingertip finger sleeve contacting the finger is provided with a film pressure sensor.

8 Claims, 4 Drawing Sheets

(56) References Cited

OTHER PUBLICATIONS

"Written Opinion of the International Searching Authority (Form PCT/ISA/237)" of PCT/CN2019/079094, dated Aug. 1, 2019, pp. 1-3.

\* cited by examiner

FLEXIBLE FINGER-WEARABLE HAPTIC FEEDBACK DEVICE

CROSS-REFERENCE TO RELATED APPLICATION

This application is a 371 of international application of PCT application serial no. PCT/CN2019/079094, filed on Mar. 21, 2019, which claims the priority benefit of China application no. 201811301176.5, filed on Nov. 2, 2018. The entirety of each of the above mentioned patent applications is hereby incorporated by reference herein and made a part of this specification.

BACKGROUND

Technical Field

The invention relates to the field of finger-wearable haptic feedback design, and particularly to a flexible finger-wearable haptic feedback device.

Description of Related Art

A haptic feedback device is an apparatus for providing bidirectional interaction capacity in human-computer interaction. It provides haptic and force information for a user in an interaction process, thereby greatly improving the sense of immersion and the sense of reality of the user in a virtual environment. The haptic feedback technology is promising in a plurality of fields. For example, in the field of rehabilitation care, the haptic feedback device can be applied to the research of a cancer tumor simulator to improve the diagnosis capacity and procedural capacity, and in the field of aerospace, a necessary feedback mechanism may be designed in the exercise process to improve the authenticity of simulation training.

A traditional haptic feedback device is mostly fixed on a desktop, and the user grabs an end effector of the device in hands for single point contact with an object in a virtual environment to acquire force feedback. This is an interactive form of a constrained hand motion. In order to pursue a natural and comfortable human-computer interaction experience, researches related to the wearable haptic feedback technology arise. A wearable haptic feedback device is worn on a limb of an operator (such as fingers, arms and the like), posing a relatively small effect on limb motion and featuring compactness, portability and natural interaction.

SUMMARY

In order to solve the above problems, the present invention provides a flexible finger-wearable haptic feedback device which features portability, convenience, flexibility in finger movement and natural interaction, and provides haptic feedback for fingers.

Technical scheme. The present invention provides a flexible finger-wearable haptic feedback device, including a fingertip sleeve sheathing a distal phalanx of a finger, a middle sleeve sheathing a middle phalanx of the finger, a proximal sleeve sheathing a proximal phalanx of the finger, an outer transmission rod having bending elasticity arranged on a back of the finger, and an inner transmission rod having bending elasticity arranged on a pad of the finger. The outer transmission rod is fixed on the fingertip sleeve at one end, sequentially passes through outer portions of the middle sleeve and the proximal sleeve, and is positioned at a back of a hand at the other end and connected with an outer driver for applying push-pull force to the outer transmission rod. The inner transmission rod is fixed on the fingertip sleeve at one end, sequentially passes through inner portions of the middle sleeve and the proximal sleeve, and is positioned at a palm at the other end and connected with an inner driver for applying push-pull force to the inner transmission rod. The fingertip sleeve is provided with a first contact pressure sensor connected with the end of the outer transmission rod, the fingertip sleeve is provided with a second contact pressure sensor connected with an end portion of the inner transmission rod, and an inner wall of a portion of the fingertip finger sleeve contacting the pad of the finger is provided with a film pressure sensor.

Furthermore, the outer portion of the fingertip sleeve is provided with a fingertip upper boss, and the fingertip upper boss is provided with a through hole for receiving the outer transmission rod. An inner portion of the fingertip sleeve is provided with a fingertip lower boss, and the fingertip lower boss is provided with a through hole for receiving the inner transmission rod. The outer portion of the middle sleeve is provided with a middle upper boss, and the middle upper boss is provided with a through hole for receiving the outer transmission rod. The inner portion of the middle sleeve is provided with a middle lower boss, and the middle lower boss is provided with a through hole for receiving the inner transmission rod. The outer portion of the proximal sleeve is provided with a proximal upper boss, and the proximal upper boss is provided with a through hole for receiving the outer transmission rod. The inner portion of the proximal sleeve is provided with a proximal lower boss, and the proximal lower boss is provided with a through hole for receiving the inner transmission rod.

Furthermore, the middle upper boss comprises a plurality of boss sections spaced-apart and arranged along a finger direction. The middle lower boss comprises a plurality of boss sections spaced-apart and arranged along the finger direction. The proximal upper boss comprises a plurality of boss sections spaced-apart and arranged along the finger direction. The proximal lower boss comprises a plurality of boss sections spaced-apart and arranged along the finger direction.

Furthermore, the outer portion of the fingertip sleeve and the outer portion of the middle sleeve are provided with a corrugated connector therebetween. The outer portion of the middle sleeve and the outer portion of the proximal sleeve are provided with a corrugated connector therebetween.

Furthermore, the outer portions of the fingertip sleeve, the middle sleeve and the proximal sleeve are each provided with a connector notch; two ends of the corrugated connectors are bonded to the connector notches.

Furthermore, the fingertip sleeve, two sides of the middle sleeve and the proximal sleeve are respectively provided with a plurality of lateral round holes.

Furthermore, the inner portions of the middle sleeve and the proximal sleeve are respectively provided with a plurality of gaps.

Furthermore, the corrugated connectors are made of soft rubber.

Furthermore, a part of the outer transmission rod penetrating into the fingertip upper boss is provided with a fixing hole, the fingertip upper boss is provided with a threaded hole aligned to the fixing hole and a screw threaded in the threaded hole, and the screw penetrates through the fixing hole. A part of the inner transmission rod penetrating into the fingertip lower boss is provided with a fixing hole, the fingertip lower boss is provided with a threaded hole aligned to the fixing hole and a screw threaded in the threaded hole, and the screw penetrates through the fixing hole. A diameter of the fixing hole is larger than an external diameter of the thread of the screw.

Furthermore, the outer transmission rod and the inner transmission rod are spring steel sheets, and the outer driver and the inner driver are pushrod motors.

Beneficial effects. Firstly, the present invention has small constraint on finger movement, and can transmit the push-pull force of the driver devices to the fingertip through a flexible material and structure, thereby realizing a natural human-computer interaction form. On one hand, when the drivers are not operating, the spring steel sheets have larger yield strength, and can generate recoverable bending deformation under certain bending strength, and the corrugated soft rubber connectors between the finger sleeves features flexibility and compressibility. Therefore, the finger may bend freely, and the movement of the finger is substantially not limited. On the other hand, when the drivers are operating, the spring steel sheets connected with the drivers generate push-pull force. As the spring steel sheets still have rigidity and one end of the spring steel sheets is fixed on the fingertip finger sleeve through a screw, the spring steel sheets push-pull force the fingertip finger sleeve, such that the finger sleeve generates push-pull force on the fingertip.

Secondly, the device has three pressure signal detections, including the pressure of the fingertip sleeve on the finger, the pressure of the outer transmission rod on the fingertip sleeve and the pressure of the inner transmission rod on the fingertip sleeve. The three pressure signals serve as feedback signals, such that the working conditions of the inner driver and the outer driver can be adjusted by closed-loop control to accurately control the force of the device applied to the finger.

Thirdly, the corrugated connectors between finger sleeves have the compressible characteristic, which facilitates the wearing on fingers with different lengths. In addition, the lateral round holes formed on the finger sleeves and elastic ropes through the round holes facilitate the wearing by fingers with different diameters.

Fourthly, the device is compact in structure and provides a natural interactive mode. When a user wearing the device performs hand operations such as grabbing object in a virtual environment, the device can provide haptic feedback information for the finger without producing the hindrance to the hand motion. As such, the device has important research meaning and practical value for the improvement of the sense of immersion and the sense of reality in a human-computer interaction process in a virtual environment.

DESCRIPTION OF THE EMBODIMENTS

Figure 1:
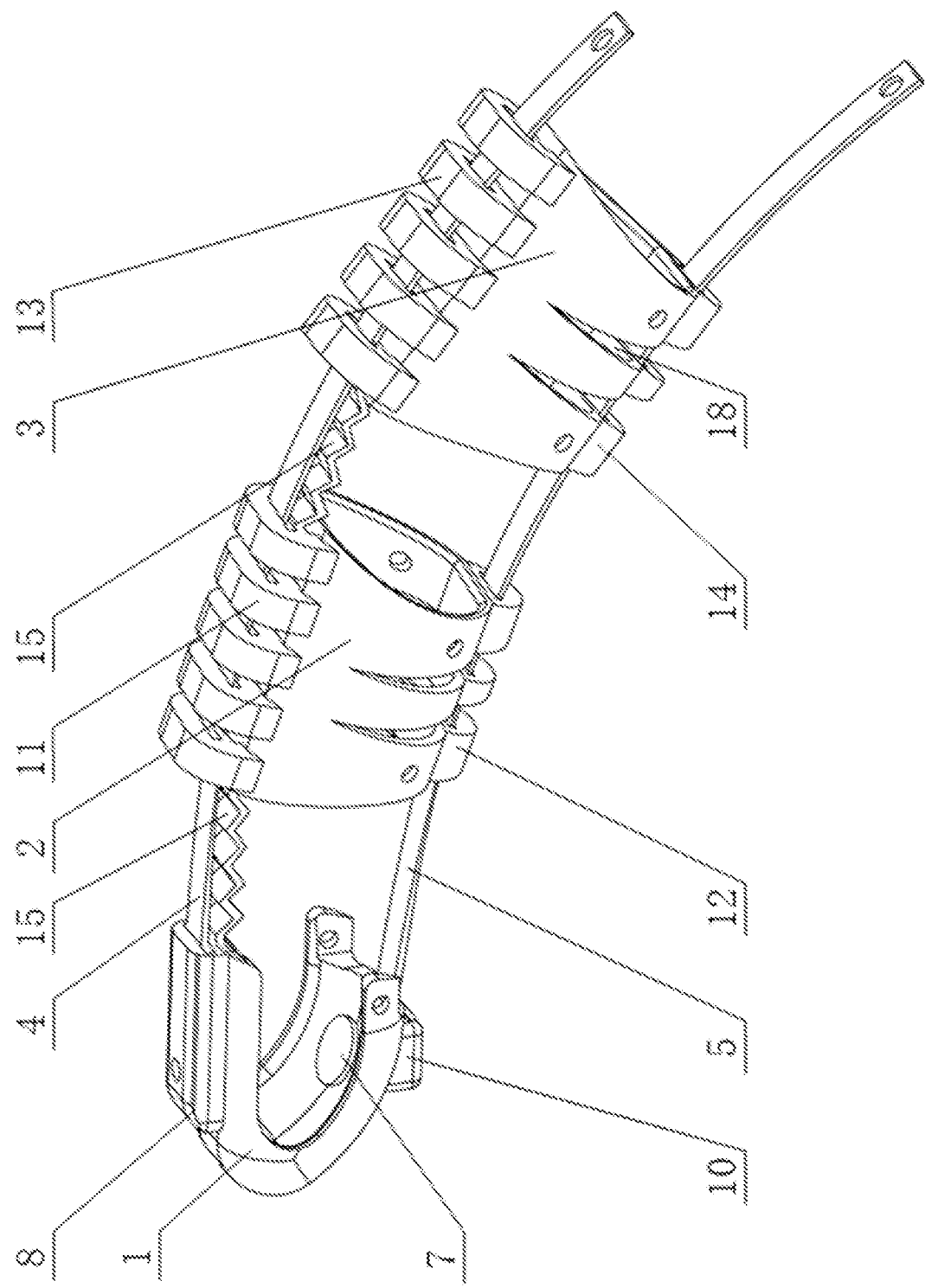
FIG. 1 is a schematic view of the overall structure of the present invention.

As shown in FIG. 1, the present invention provides a flexible finger-wearable haptic feedback device. The flexible finger-wearable haptic feedback device includes a fingertip sleeve 1 sheathing a distal phalanx of a finger, a middle sleeve 2 sheathing a middle phalanx of the finger, a proximal sleeve 3 sheathing a proximal phalanx of the finger, an outer transmission rod 4 having bending elasticity arranged on a back of the finger, and an inner transmission rod 5 having bending elasticity arranged on a pad of the finger. The outer transmission rod 4 and the inner transmission rod 5 are spring steel sheets. As the spring steel sheets have high yield strength, the bending of the finger causes the bending of spring steel sheets. However, the bending strength will not reach the yield strength, such that the spring steel sheets can restore to the original shape after external force is removed.

Figure 2:
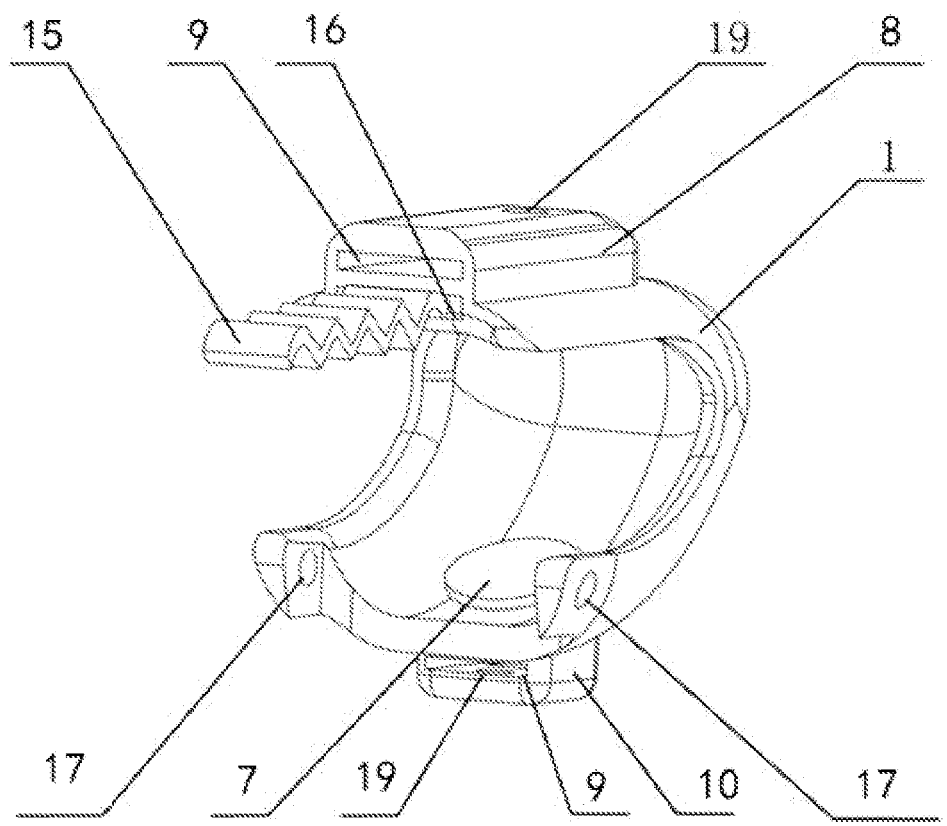
FIG. 2 is a structural schematic view of a fingertip sleeve of the present invention.

As shown in FIG. 2, an outer portion of the fingertip sleeve 1 is provided with a fingertip upper boss 8, and the fingertip upper boss 8 is provided with a through hole 9 for receiving the outer transmission rod 4. An inner portion of the fingertip sleeve 1 is provided with a fingertip lower boss 10, and the fingertip lower boss 10 is provided with a through hole 9 for receiving the inner transmission rod 5. A part of the outer transmission rod 4 penetrating into the fingertip upper boss 10 is provided with a fixing hole, the fingertip upper boss 10 is provided with a threaded hole 19 aligned to the fixing hole and a screw threaded in the threaded hole 19, and the screw penetrates through the fixing hole. A part of the inner transmission rod 5 penetrating into the fingertip lower boss 10 is provided with a fixing hole, the fingertip lower boss 10 is provided with a threaded hole 19 aligned to the fixing hole and a screw threaded in the threaded hole 19, and the screw penetrates through the fixing hole. With the above structure, one end of the outer transmission rod 4 is fixed on the upper boss of the fingertip sleeve 1, and one end of the inner transmission rod 5 is fixed on the lower boss of the fingertip sleeve 1. In addition, since a diameter of the fixing hole is larger than an external diameter of the thread of the screw, the outer transmission rod 4 and the inner transmission rod 5 may be displaced relative to the screw in the action of external force.

Figure 4:
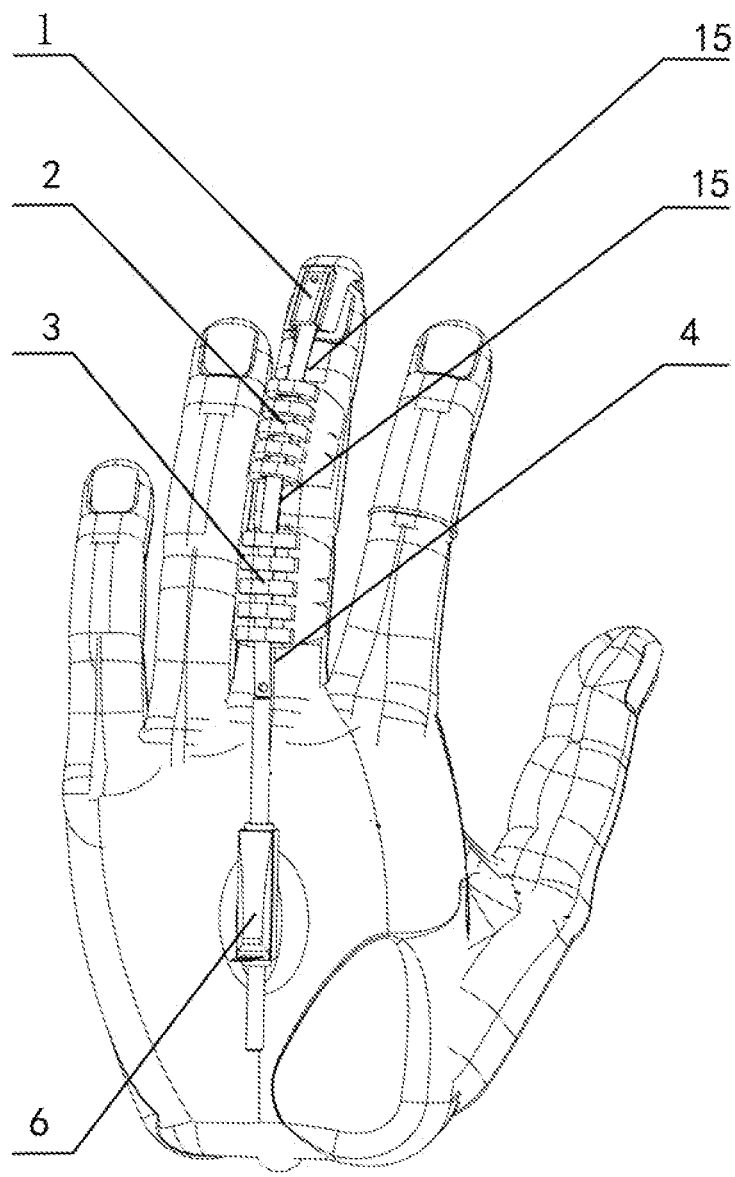
FIG. 4 is a schematic view of the present invention being worn.

As shown in FIG. 4, the other end of the outer transmission rod 4 positioned a back of a hand is connected with an outer driver 6 for applying push-pull force to the outer transmission rod 4, and the other end of the inner transmission rod 5 positioned at a palm of the hand is connected with an inner driver for applying push-pull force to the inner transmission rod 5. In this embodiment, the outer driver 6 and the inner driver are pushrod motors. In application, when the inner driver pushes the inner transmission rod 5, the outer driver 6 pulls the outer transmission rod 4, which applies an external force to the fingertip sleeve, making the finger feels a pressure vertical to the surface of the finger pulp. Conversely, when the inner driving device pulls the inner transmission rod 5, the outer driving device pushes the outer transmission rod 4, and which applies an external force to the fingertip sleeve, making the finger feels a pressure vertical to the surface of the finger back.

The fingertip upper boss 8 of the fingertip sleeve 1 is provided with a first contact pressure sensor connected with the end of the outer transmission rod 4, and the first contact pressure sensor is configured for measuring the pressure of the outer transmission rod 4 on the fingertip sleeve. The fingertip lower boss 10 of the fingertip sleeve 1 is provided with a second contact pressure sensor connected with the end of the inner transmission rod 5, and the second contact pressure sensor is configured for measuring the pressure of the inner transmission rod 5 on the fingertip sleeve. An inner wall of a portion of the fingertip sleeve 1 contacting the finger is provided with a film pressure sensor 7 for measuring the pressure of the fingertip sleeve 1 on the finger pulp. Through a closed-loop control algorithm of three pressure signals, the closed-loop control of the working conditions of the inner drive and the outer drive 6 can be implemented.

Figure 3:
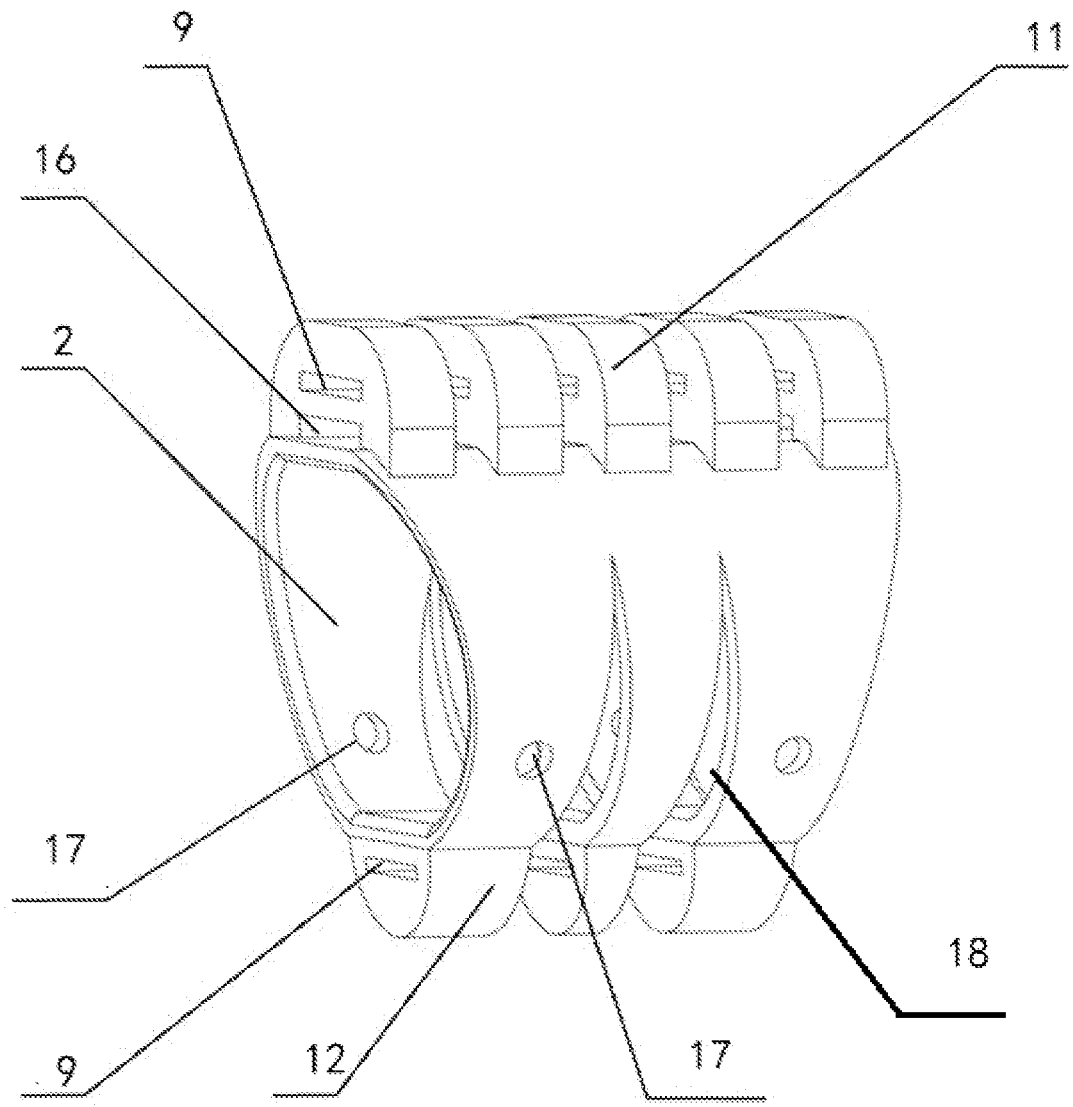
FIG. 3 is a structural schematic view of a middle sleeve of the present invention.

As shown in FIG. 3, an outer portion of the middle sleeve 2 is provided with a middle upper boss 11, and the middle upper boss 11 is provided with a through hole 9 for receiving the outer transmission rod 4. An inner portion of the middle sleeve 2 is provided with a middle lower boss 12, and the middle lower boss 12 is provided with a through hole 9 for receiving the inner transmission rod 5. An outer portion of the proximal sleeve 3 is provided with a proximal upper boss 13, the proximal upper boss 13 is provided with a through hole 9 for receiving the outer transmission rod 4. An inner portion of the proximal sleeve 3 is provided with a proximal lower boss 14, and the proximal lower boss 14 is provided with a through hole 9 for receiving the inner transmission rod 5. The outer transmission rod 4 is defined by the middle upper boss 11 and the middle lower boss 12, such that the outer transmission rod is tightly attached to the finger and may not deviate or tilt. The inner transmission rod 5 is defined by the proximal upper boss 13 and the proximal lower boss 14, such that the inner transmission rod is tightly attached to the finger and may not deviate or tilt.

The middle upper boss 11 comprises a plurality of spaced-apart boss sections arranged along a finger direction. The middle lower boss 12 comprises a plurality of spaced-apart boss sections arranged along the finger direction. The proximal upper boss 13 comprises a plurality of spaced-apart boss sections arranged along the finger direction. The proximal lower boss 14 comprises a plurality of spaced-apart boss sections arranged along the finger direction. Since the middle phalanx and the proximal phalanx of the finger may bend in application, the middle upper boss 11, the middle lower boss 12, the proximal upper boss 13 and the proximal lower boss 14 also need flexible bending deformation. In the embodiment, the boss sections are designed to distribute at intervals along the finger direction, the gap between each boss section enables the outer end of the boss section to move flexibly, such that the whole boss array exhibits an arc shape, and the finger movement is more flexible, which is also beneficial to the bending deformation and recovery deformation of the spring steel sheets penetrating through the boss sections.

The outer portion of the fingertip sleeve 1 and the outer portion of the middle sleeve 2 are provided with a corrugated connector 15 made of soft rubber therebetween, and the outer portion of the middle sleeve 2 and the outer portion of the proximal sleeve 3 are provided with a corrugated connector 15 therebetween. The outer portions of the fingertip sleeve 1, the middle sleeve 2 and the proximal sleeve 3 are each provided with a connector notch 16, and two ends of the corrugated connectors 15 are bonded to the connector notches 16. The corrugated connectors 15 are configured for connecting the fingertip sleeve 1, the middle sleeve 2 and the proximal sleeve 3, such that the three sleeves may not slide relatively to influence the use. The structure and the material of the corrugated connectors 15 ensure that the corrugated connector have certain elasticity and are easy to deform, such that this embodiment can adapt to fingers with different lengths. In addition, when the finger bends, bending joints of the finger in the bent state may not be uncomfortable or obstructed.

Two sides of the fingertip sleeve 1, the middle sleeve 2 and the proximal sleeve 3 are respectively provided with a plurality of lateral round holes 17. The round holes 17 are configured for receiving elastic ropes passing through to firmly tie the finger sleeves on the finger, so as to adapt to fingers with different diameters and facilitate wearing.

The inner portions of the middle sleeve 2 and the proximal sleeve 3 are respectively provided with a plurality of gaps 18. When the finger bends, the inner portions of the middle sleeve 2 and the proximal sleeve 3 also bend. Formation of the plurality of gaps 18 enables the bending of the middle sleeve 2 and the proximal sleeve 3, reduces the bending resistance, and makes the use more comfortable.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A flexible finger-wearable haptic feedback device, comprising a fingertip sleeve sheathing a distal phalanx of a finger, a middle sleeve sheathing a middle phalanx of the finger, a proximal sleeve sheathing a proximal phalanx of the finger, an outer transmission rod having bending elasticity arranged on a back of the finger, and an inner transmission rod having bending elasticity arranged on a pad of the finger, wherein the outer transmission rod is fixed on the fingertip sleeve at one end, sequentially passes through an outer portion of the middle sleeve and an outer portion of the proximal sleeve, and is positioned at a back of a hand at the other end and connected with an outer driver for applying push-pull force to the outer transmission rod; the inner transmission rod is fixed on the fingertip sleeve at one end, sequentially passes through an inner portion of the middle sleeve and an inner portion of the proximal sleeve, and is positioned at a palm at the other end and connected with an inner driver for applying push-pull force to the inner transmission rod; the fingertip sleeve is provided with a first contact pressure sensor connected with an end portion of the outer transmission rod, the fingertip sleeve is provided with a second contact pressure sensor connected with an end portion of the inner transmission rod, and an inner wall of a portion of the fingertip sleeve contacting the pad of the finger is provided with a film pressure sensor, wherein an outer portion of the fingertip sleeve and the outer portion of the middle sleeve are provided with a first corrugated connector therebetween; and the outer portion of the middle sleeve and the outer portion of the proximal sleeve are provided with a second corrugated connector therebetween, the outer portions of the fingertip sleeve, the middle sleeve and the proximal sleeve are each provided with a connector notch; and two ends of the first corrugated connector are bonded to the connector notches of the fingertip sleeve and the middle sleeve, and two ends of the second corrugated connector are bonded to the connector notches of the middle sleeve and the proximal sleeve.

2. The flexible finger-wearable haptic feedback device according to claim 1, wherein an outer portion of the fingertip sleeve is provided with a fingertip upper boss, and the fingertip upper boss is provided with a through hole for receiving the outer transmission rod; an inner portion of the fingertip sleeve is provided with a fingertip lower boss, and the fingertip lower boss is provided with a through hole for receiving the inner transmission rod;

the outer portion of the middle sleeve is provided with a middle upper boss, and the middle upper boss is provided with a through hole for receiving the outer transmission rod; the inner portion of the middle sleeve is provided with a middle lower boss, and the middle lower boss is provided with a through hole for receiving the inner transmission rod; and the outer portion of the proximal sleeve is provided with a proximal upper boss, and the proximal upper boss is provided with a through hole for receiving the outer transmission rod; the inner portion of the proximal sleeve is provided with a proximal lower boss, and the proximal lower boss is provided with a through hole for receiving the inner transmission rod.

3. The flexible finger-wearable haptic feedback device according to claim 2, wherein the middle upper boss comprises a plurality of boss sections spaced-apart and arranged along a finger direction; the middle lower boss comprises a plurality of boss sections spaced-apart and arranged along the finger direction; the proximal upper boss comprises a plurality of boss sections spaced-apart and arranged along the finger direction; and the proximal lower boss comprises a plurality of boss sections spaced-apart and arranged along the finger direction.

4. The flexible finger-wearable haptic feedback device according to claim 2, wherein a part of the outer transmission rod penetrating into the fingertip upper boss is provided with a first fixing hole, the fingertip upper boss is provided with a first threaded hole aligned to the first fixing hole and a first screw threaded in the first threaded hole, and the first screw penetrates through the first fixing hole; a part of the inner transmission rod penetrating into the fingertip lower boss is provided with a second fixing hole, the fingertip lower boss is provided with a second threaded hole aligned to the second fixing hole and a second screw threaded in the second threaded hole, and the second screw penetrates through the second fixing hole; and a diameter of the first fixing hole is larger than an external diameter of thread of the first screw, and a diameter of the second fixing hole is larger than an external diameter of thread of the second screw.

5. The flexible finger-wearable haptic feedback device according to claim 1, wherein the outer transmission rod and the inner transmission rod are spring steel sheets; and the outer driver and the inner driver are pushrod motors.

6. The flexible finger-wearable haptic feedback device according to claim 1, wherein two sides of the fingertip sleeve, the middle sleeve and the proximal sleeve are respectively provided with a plurality of lateral round holes.

7. The flexible finger-wearable haptic feedback device according to claim 1, wherein the inner portion of the middle sleeve and the inner portion of the proximal sleeve are respectively provided with a plurality of gaps.

8. The flexible finger-wearable haptic feedback device according to claim 1, wherein the first and second corrugated connectors are made of soft rubber.

* * * * *